United States Patent [19]

Hammel et al.

[11] Patent Number: 4,891,590

[45] Date of Patent: Jan. 2, 1990

[54] LINEAR RESOLVER UTILIZING PLURAL NULLED COIL SETS

[75] Inventors: William S. Hammel, Franksville; Donald B. Lawson, South Milwaukee; Keith W. Van Patten, Racine, all of Wis.

[73] Assignee: Unico, Inc., Franksville, Wis.

[21] Appl. No.: 204,132

[22] Filed: Jun. 8, 1988

[51] Int. Cl.$^4$ .................... G01B 7/14; G08C 19/06; H01F 21/00
[52] U.S. Cl. .................... 324/207; 318/661; 336/45; 340/870.32; 340/870.36
[58] Field of Search .................... 324/207, 208; 318/657–661; 336/45, 130, 136; 340/870.31, 870.32, 870.33, 870.35, 870.36

[56] References Cited

U.S. PATENT DOCUMENTS

| | | | |
|---|---|---|---|
| 2,911,632 | 11/1959 | Levine et al. | 340/870.31 |
| 3,032,754 | 5/1962 | Di Pietro | 340/282 |
| 3,183,496 | 5/1965 | Goldstein | 340/196 |
| 3,857,089 | 12/1974 | Adler et al. | 324/34 |
| 4,014,015 | 3/1977 | Gundlach | 324/208 X |
| 4,134,065 | 1/1979 | Bauer et al. | 324/208 |
| 4,282,485 | 8/1981 | Pauwels et al. | 324/208 |
| 4,297,698 | 10/1981 | Pauwels et al. | 340/870.32 |
| 4,629,983 | 12/1986 | Boomgaard et al. | 324/208 |
| 4,694,246 | 9/1987 | Avisse | 324/207 |
| 4,697,144 | 9/1987 | Howbrook | 324/207 |
| 4,700,189 | 10/1987 | Welburn | 340/870.35 |
| 4,705,971 | 11/1987 | Nagasaka | 310/12 |

*Primary Examiner*—Gerard R. Strecker
*Attorney, Agent, or Firm*—Quarles & Brady

[57] ABSTRACT

A linear resolver utilizes multiple pairs of nulled coil sets arranged co-linearly for sensing the position of multiple edges of a magnetically permeable object. An excitation coil produces an alternating magnetic field which is normally weakly coupled to the nulled coil sets across a magnetic gap. As the object covers the area of the gap, the coupling between the excitation and the individual coils in a nulled coil set is increased. Each nulled coil set produces an output which varies cyclically with increasing coverage of the object. The two nulled coil sets in each pair of nulled coil sets are offset from each other so that their cyclical outputs are offset by one quarter cycle, or 90° with respect to the area of coverage by the object. Detection means are provided which resolve the outputs from a pair of nulled coil sets to precisely determine the position of the object edge. Each nulled coil pair is processed separately by the detection means so that multiple edges can be detected.

4 Claims, 16 Drawing Sheets

PEAK RESPONSE OF SECONDARY COIL GROUPS

UPDATE PLL

LINEAR RESOLVER UTILIZING PLURAL NULLED COIL SETS

BACKGROUND OF THE INVENTION

The field of the invention is sensors for determining the linear position of an object and, more particularly, linear resolvers.

Linear resolvers have generally been known and used in the prior art. Such prior art linear resolvers are analogous to their rotary counterparts, except that the excitation and secondary windings are laid out flat, comprising primary and secondary coils adapted for relative linear motion. An example of such a system is described in U.S. Pat. No. 4,705,971. Other types of linear resolvers utilize a movable slug or magnetically permeable actuator to alter the coupling from primary to secondary.

One drawback of prior linear resolvers is that they are unable to directly sense the position of an object. Instead, the object to be sensed must be mechanically linked to the linear resolver mechanism. Some systems are known for sensing the presence of a magnetically permeable object by using magnetic coupling through the object to establish its presence or absence, or even an approximate position, but such systems are unable to provide the precise position information available from a resolver.

Another drawback of prior linear resolvers is that they are able to determine the position of only one object at a time, e.g. the object coupled to the actuator. In the case of prior magnetic sensing devices too, only one object can be sensed at a time; the presence of multiple objects would result in erroneous readings.

SUMMARY OF THE INVENTION

A linear resolver according to the present invention provides a non-contact precision sensor for determining the precise locations of the edges of magnetically permeable objects. This is accomplished in the present invention by utilizing offset pairs of multi-pole nulled coil groups. The nulled coil groups are arranged and interconnected in such a way that the response of each nulled coil group varies cyclicly with monotonically changing area of coverage by the magnetically permeable object, e.g. the object edge position, and that the responses of the two nulled coil groups are mutually orthogonal with respect to the position of the object. As a result, the response of the nulled coil groups is the same when either the nulled coil groups are completely covered or completely uncovered by the magnetically permeable object, and varies in a closed cycle in between.

In that way, the responses for a particular edge location or area of coverage can be precisely geometrically resolved. In one aspect of the invention, the nulled coil groups may be arranged as orthogonal secondaries for a single phase primary excitation source.

In another aspect of this invention, multiple independent pairs of nulled coil groups are arranged along a predetermined path. Each independent pair of nulled coil groups is processed separately to determine if an object edge is in view of the pair, and if so to determine the precise position of that edge. The multiple independent pairs may therefore comprise a continuous linear resolver capable of detecting, determining the precise position of, and tracking multiple magnetic object edges.

One specific object of this invention is to determine not only the position, but also the length of a magnetic object by simultaneously tracking the leading and trailing edges of the object.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
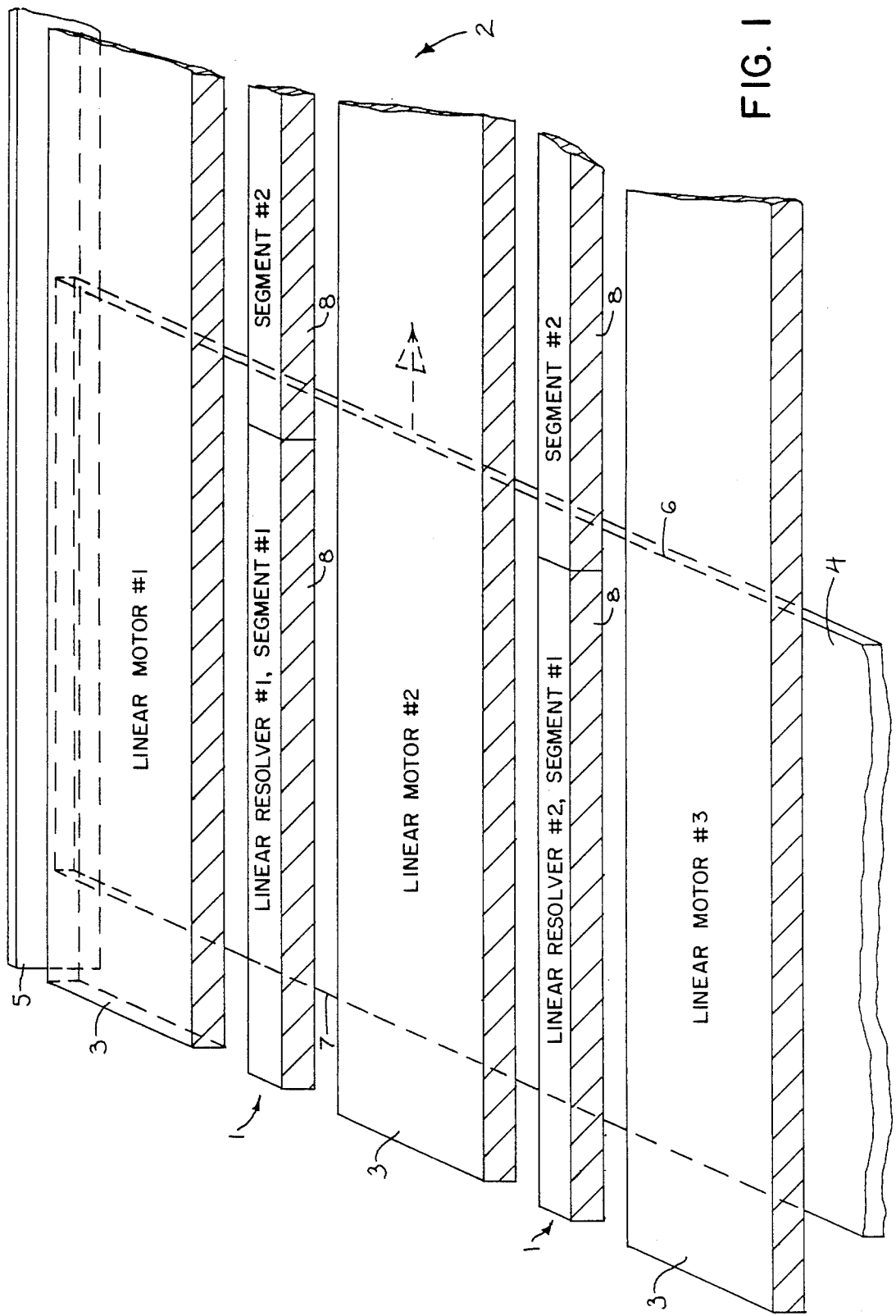
FIG. 1 is a block diagram of a sheet metal transfer line which incorporates a linear resolver of the present invention.

Referring to FIG. 1, a linear resolver 1 according to the present invention is employed as a sensor in sheet metal transfer line 2. The transfer line 2 comprises a plurality of linear induction motors 3 arranged in a row. A piece of sheet metal 4 to be transferred is suspended beneath the linear motors 3 by the attractive magnetic force generated by the linear motors 3. Air bearings (not shown) are employed to prevent contact between the sheet metal 4 and the linear motors 3.

The sheet metal 4 is fed in from the left end as seen in FIG. 1 and transported to the right by the action of the linear motors 3. A guide rail 5 is provided on one end of the row of linear motors 3 to act as a stop and align the sheet metal 4 as it is transferred down the line 2.

Each linear motor 3 is 33 feet long, consisting of two twelve foot segments and one nine foot segment. The row of linear motors 3 actually consists of four linear motors 3, although only three are shown in FIG. 1. A first linear resolver 1 is disposed between the first and second linear motors. A second identical linear resolver 1 is positioned between the second and third linear motors 3.

As described in detail below, the linear resolvers 1 produce a precise measurement of the location of the leading edge 6 and the trailing edge 7 of the pieces of sheet metal 4 as it moves down the line 2. Outputs from the linear resolvers 1 are processed by a detection system, described below, to perform the actual measurements. The measurements from the detection system are then forwarded to a control system (not shown) for use in controlling the transfer of the sheet metal 4.

In the actual control system corresponding to this exemplary embodiment, the sheet metal 4 is to be stacked into piles according to size, grade, and other criteria. The control system (not shown) utilizes the position information from the linear resolvers 1 to release the sheet metal at a precise point over the appropriate stacker (not shown). At the release point, the linear motors 3 are shut off and the sheet metal piece 4 falls onto the stacker (not shown) by gravity.

Also, by analyzing the difference between the measurements from the two linear resolvers, the control system is able to detect and correct for skew of the sheet metal 4. By providing differential drive to the different linear motors 3, the skew in the sheet metal 4 can be controlled. The sheet metal 4 can thereby be maneuvered against the stop 5 and maintained in a square orientation.

While it is within the scope of this invention to form the linear resolvers 1 in any length, in this embodiment each of the two linear resolvers 1 are formed from three colinear segments 8, two of which are shown in FIG. 1. Two of the segments 8 are 12 feet long and the third is 9 feet long, providing the same overall length of 33 feet as the linear motors 3. A technique is described below for joining adjacent segments together so that the linear resolver may be formed in any arbitrary length and with any number of segments.

Figure 2:
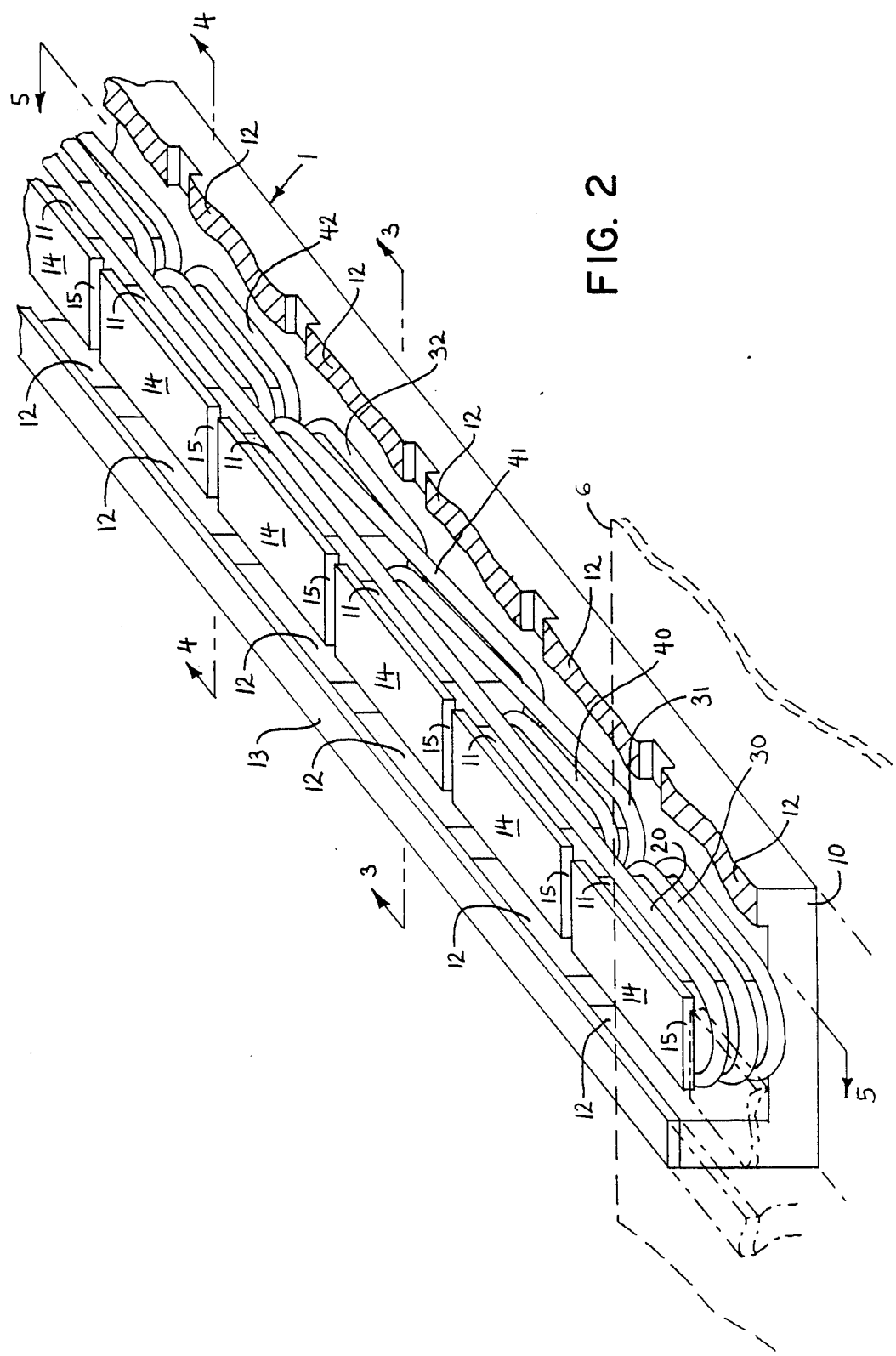
FIG. 2 is perspective view of the underside of the linear resolver which forms a part of the transfer line of FIG. 1.

Referring to FIG. 2, the details of the linear resolver 1 according to this invention can now be described. The linear resolver 1 comprises a main body 10 which defines a series of center poles 11. Two side poles 12 are positioned on either side of each center pole 11. In FIG. 2, the nearer side poles 12 are shown cut away to reveal inner details of the linear resolver 1. The main body 10 is formed from thin magnetically permeable laminations although individual laminations are not shown for clarity of illustration.

A strip of magnetically permeable material 13 is placed lengthwise across the tops of all the side poles 12 on each side of the main body 10. The strip 13 magnetically shunts all the side poles 12 on each respective side, in effect defining single common side poles. Each center pole 11 is covered by another strip of magnetically permeable material 14. The strips 14 extend beyond the length of the associated center pole 11, but are short of the edge on the adjoining strip 14. Adjoining strips 14 thereby define a gap 15. The purpose of the strips 14 is to reduce the magnetic gap between the center poles 11, while still maintaining each center pole 11 magnetically isolated.

The linear resolver 1 in FIG. 2 is shown with the poles 11 and 12 facing up for clarity of illustration. In that case, a magnetic material to be sensed, for example the sheet metal 4 of FIG. 1, appears across the top of the linear resolver 1. As the material 4 covers a portion of the linear resolver 1, the affected center pole 11 is magnetically coupled to the side poles 12. The resulting change in magnetic flux is detected by a series of coils described below to precisely determine the area of the poles 11 and 12 covered. The area covered in turn determines the position of the leading edge 6 of the material 4.

The center poles 11 are wound with a series of coils. A single primary excitation coil 20 is wound around the entire length of all the center poles 11 in a segment. A series of secondary coils 30–32 and 40–42 are selectively wound around specific center poles 11 in a manner described in detail below.

Figure 3:
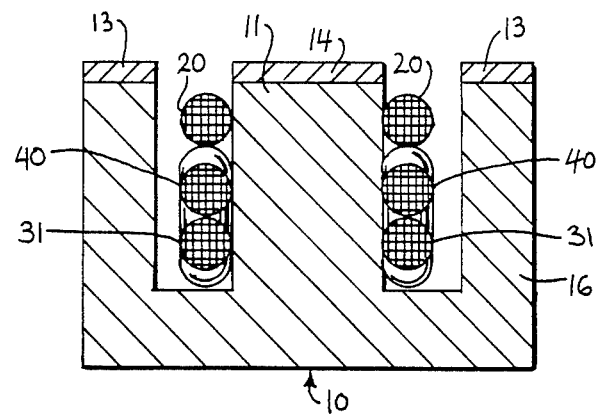
FIG. 3 is a sectional view taken on line 3—3 of FIG. 2.
Figure 4:
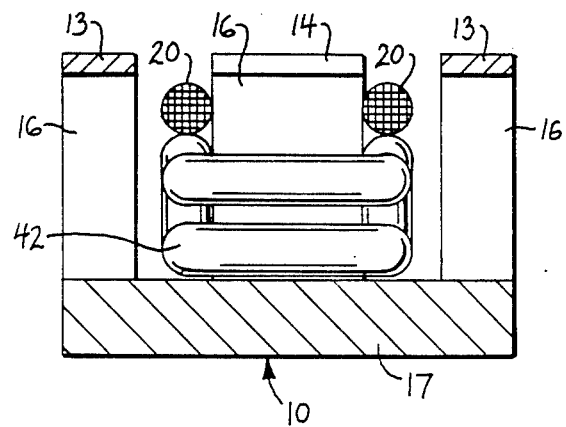
FIG. 4 is a sectional view taken on line 4—4 of FIG. 2.
Figure 4A:
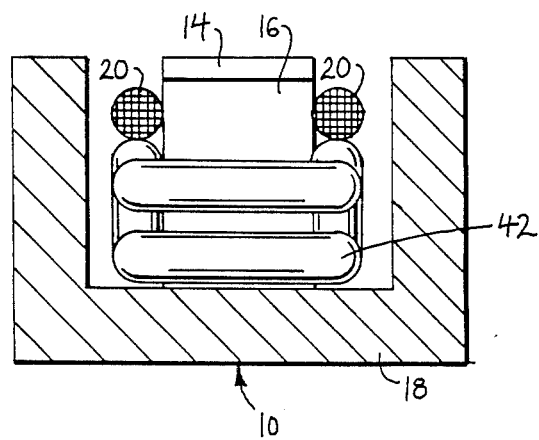
FIG. 4a is a view similar to the view of FIG. 4 showing an alternate embodiment for the laminations between center poles.

Referring to FIG. 3, the laminations 16 across the center poles 11 are of the "E" configuration. In FIG. 4, the laminations 17 across the gaps between poles 11 and 12 are shown as being of the "I" configuration. As an alternative, the "I" lamination 17 may be replaced with "C" laminations 18 as shown in FIG. 4a. In the latter case, the gap between center poles 11 is maintained, but the gap between side pole 12 is eliminated. It is then not necessary to include strip 13 as the side poles 12 are already continuous.

Figure 5:
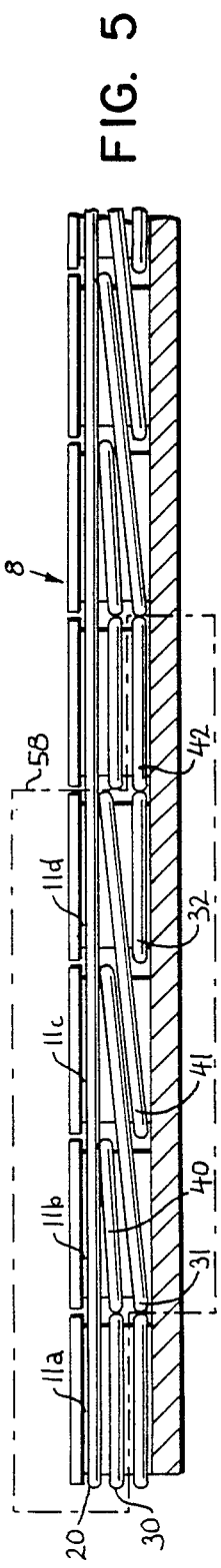
FIG. 5 is a sectional view taken on line 5—5 of FIG. 2.
Figure 6:
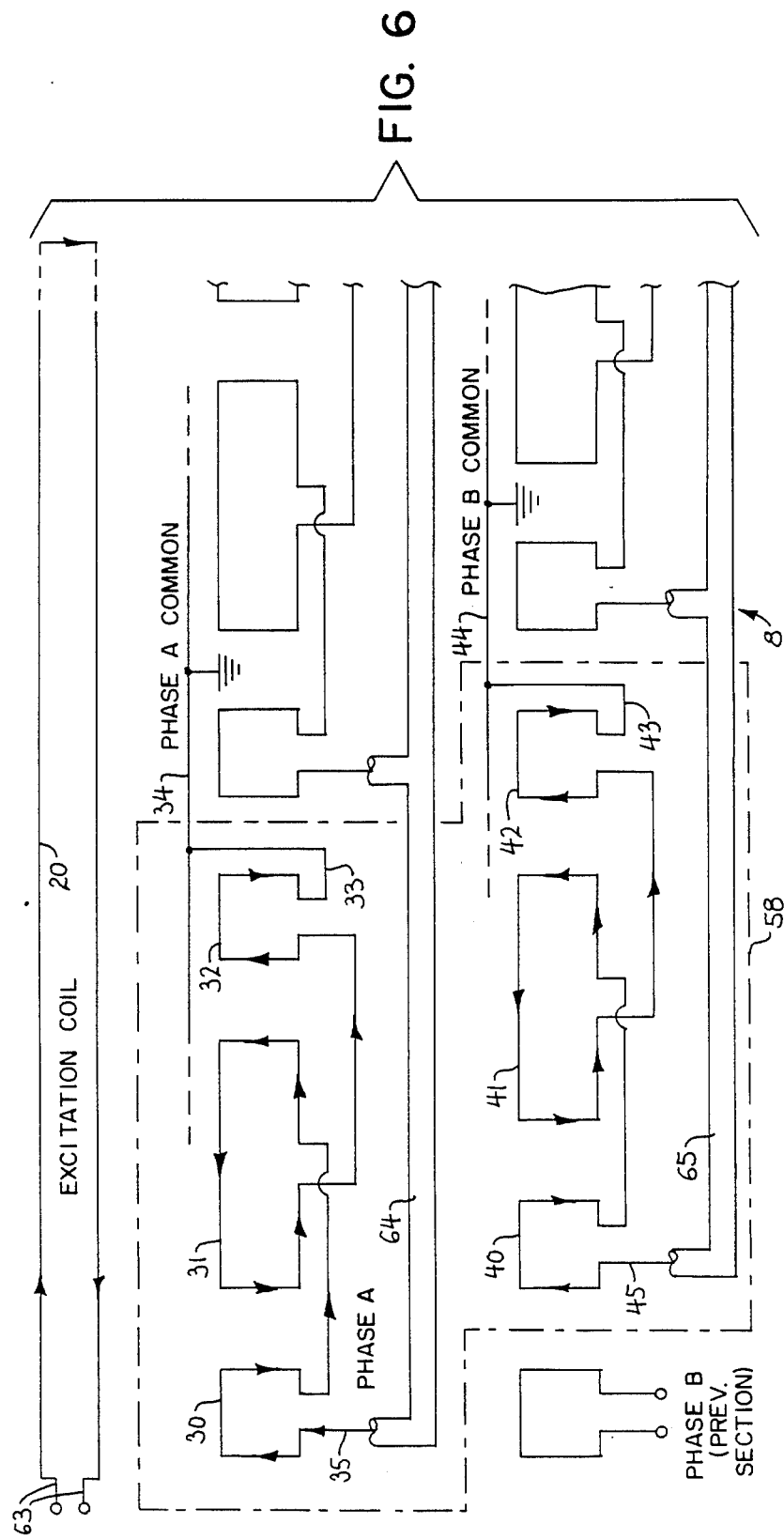
FIG. 6 is a simplified electrical schematic diagram showing the interconnection of the coils of FIG. 5.

Referring to FIGS. 5 and 6, the secondary coils for the linear resolver 1 are separated into two phases, designated herein as phase A and phase B. Within each phase, the secondary coils are interconnected into groups. Each secondary coil group comprises one coil wound around a single center pole 11, a second coil wound around both of the next two sequential center poles 11, and a third coil wound around the fourth sequential center pole 11.

For example, coils 30–32 comprise the secondary coil group representing phase A, section 0. Coil 30 is wound around center pole 11a, coil 31 spans both center poles 11b and 11c, and coil 32 is wound around center pole 11d. The coils 30–32 are connected in series such that the polarity, or sense of winding of the middle coil 31 spanning two poles 11b and 11c is reversed from that of the other two poles 30 and 34. One end 33 of the series is connected to a phase A common line 32. The other end 35 of the series is the output of the secondary coil group.

The excitation coil 20 spans all the center poles 11 and is excited by a 400 Hz square wave. When no magnetic material is present over the pole faces, a small leakage flux is driven through the secondary coils 30-32 by the excitation coil 20. In that case, the flux through the center poles 11a-11d is approximately equal in each pole 11. The voltage induced in coil 31 is approximately twice the voltage of either coil 30 or 32 since coil 31 couples twice the pole area. As a result, the output 35 in the quiescent condition is approximately zero, the coils 30-32 in effect nulling each other out. For this reason, secondary coil groups that exhibit that response are referred to as a nulled coil group or nulled coil set.

Then, when a piece of magnetic material moves in, for example from the left in FIG. 5, and provides magnetic linkage between poles 11a and 12, the voltage induced in coil 30 increases in proportion to the area of coverage of the magnetic material over the poles 11a and 12. The other coils 31 and 32 are relatively unaffected, and so the output 35 follows the increased voltage from coil 30.

As the magnetic material moves further to the right, pole 11a eventually becomes completely covered, at which time output 35 is a maximum. Still further rightward movement by the magnetic material begins to cover pole 11b, and the voltage in coil 31 increases. Since the voltage in coil 31 opposes that in coil 30, increased coverage of pole 11b causes a decrease in the output 35. With pole 11b completely covered, output 35 is back to zero. As pole 11c begins to be covered, the output 35 increases in the opposite polarity.

As explained below, the output 35 is detected in such a way that the opposite polarity signal produces a negative reading. It should be noted however that the signals on coils 30-32 are single phase, and are always in phase with the excitation. There is no phase change in the secondary coils, only magnitude and polarity.

Complete coverage of pole 11c therefore results in a maximum negative reading. Increased coverage of pole 11d induces a voltage in coil 32 which opposes that of coil 31, and the magnitude of the reverse polarity output 35 decreases. When all of the poles 11a-11d are completely covered, the voltages induced in coils 30-32 again cancel as in the case of no coverage. The output 35 remains at zero as long as poles 11a-11d remain covered.

When the trailing edge of the magnetic material begins to uncover pole 11a, the process is reversed. The output 35 is first dominated by the reverse polarity of coil 31 to a maximum negative value, then back to zero as pole 11b is uncovered, to a maximum positive value as pole 11c is uncovered, and finally back to zero as all the pole 11a-11d are uncovered.

A separate secondary coil group for phase B includes coils 40-42. The coils 40-42 correspond exactly to the coils 30-32 of phase A, except that the phase B coils 40-42 are displaced one pole to the right. The secondary coil group so formed has one end 43 of the series connected to a phase B common line 44, and the other end connected as the secondary coil group output 45.

The coils 40-42 respond in the same way as coils 30-32 described above, except the output 45 is displaced by one pole. In other words, the magnitude response of phase B lags that of phase A by one pole. One pole constitutes one quarter of the total cycle of phase A, and so can also be referred to as 90°, i.e. of a 360° cycle. The phase B output 45 therefore lags phase A output 35 by 90° with respect to movement of the magnetic material.

Referring again to FIG. 5, the coils which span two poles 11 are preferably stacked, or angled, from low to high on the poles, for example as shown by coils 31 and 41. It would be possible to keep the coils horizontal by staggering, but in that case fringing effects and other imperfections cause uneven flux linkage on differing heights on the poles. The angled overlapping of coils helps to provide better balance of the coils in a secondary coil group and between secondary coil groups.

Figure 7:
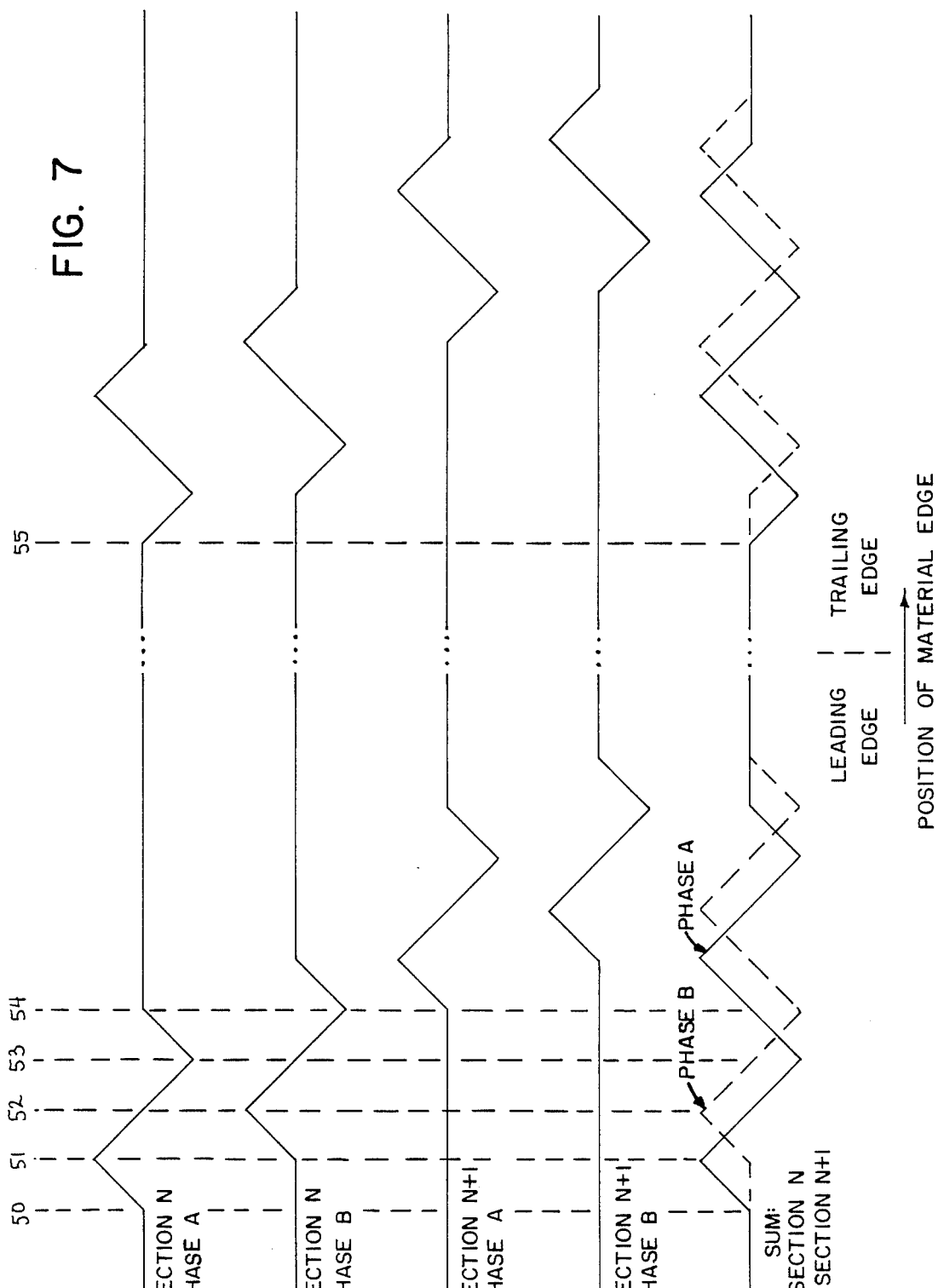
FIG. 7 is a plot of the peak response of the secondary coil groups of the resolver of FIG. 2 versus the position of the edge of a magnetic material covering the resolver.

Referring to FIG. 7, the net magnitude and polarity response of each secondary coil group, or peak response, traces out a single, roughly triangular cycle as an edge of a sheet of magnetic material passes over. For example, in a given section N, a leading edge encounters the first coil 30 in a phase A secondary coil group at point 50. As the magnetic material advances, the phase A output rises to a positive maximum at point 51. At the same point 51, the magnetic material begins to cover the first coil 40 in a phase B secondary coil group.

From point 51, the phase A output 35 decreases while the phase B output 45 rises. At point 52, phase B output 45 is at a positive maximum, while phase A output 35 is crossing through zero. Then at point 53, three poles of phase A are covered resulting in a negative maximum, and two poles of phase B are covered causing a zero output. Finally, at point 54, all four poles of phase A are covered, and output 35 is back to zero. Phase B output 45 at point 54 is at a negative maximum.

At the same point 54, the phase A secondary coil group for the next adjacent section (section N+1 in this example) becomes active, in essence taking over where phase A secondary coil group of the previous section left off, e.g. at zero and rising. As described in detail below, the preferred method of decoding involves algebraically adding together the phase outputs from adjacent sections to construct a composite value covering two complete cycles, as shown on the bottom trace of FIG. 7.

In each phase, when one section is active, e.g. the edge is in that section, the adjacent section is zero, and vice versa. This result is based on the principle that the outputs 35 and 45 of the secondary coil groups are zero both when the respective secondary coil groups are completely uncovered and completely covered.

One advantage of forming the sum of the phases from two adjacent sections is that the resolver measurements can be made across a discontinuity in a single section, for example, at point 54 where the section N, phase A output 35 becomes zero. The sections N and N+1 can always be chosen so that the edge position to be resolved lies near the continuous center of the two cycle composite region.

As the sheet of magnetic material advances, the secondary coil groups in each successive section respond in the same way described above for the generalized section N. Eventually, the trailing edge of the magnetic material will begin to uncover secondary coil groups which had been previously covered. When that happens, for example at point 55 in FIG. 7, a mirror image of the leading edge trace is produced.

The trailing edge traces are treated in the same manner as the leading edge trace, e.g. by summing adjacent traces together to form a composite trace, and resolving the composite trace to determine the position of the trailing edge. As described in detail below, it is possible with a linear resolver of this invention to simultaneously and independently determine the positions of both the leading and trailing edges of a magnetic material. In fact, in other embodiments of this invention, the positions of as many leading and trailing edges as desired, from multiple pieces of magnetic material, can be determined, limited only by the extent to which the principles of this invention are applied.

Referring to FIGS. 5 and 6, each resolver segment 8 comprises an excitation coil 20 and a plurality of secondary coil sections 58. Each secondary coil section 58 includes a phase A secondary coil group, i.e. coils 30-32, and a phase B secondary coil group, i.e. coils 40-42. The secondary coil sections 58 are hereinafter referred to simply as sections 58. The outputs 35 from all phase A secondary coil groups in a resolver segment 8 are each individually collected into a bus 64. Similarly, all of the outputs 45 from the phase B secondary coil groups in a resolver segment 8 are collected into a bus 65.

In the particular embodiment described herein, the total length of each resolver 1 is 33 feet, comprising two resolver segments 8 of twelve feet each and one resolver segment 8 of nine feet. The physical length of each pole 11 in this embodiment is 2.25 inches, so that the physical span of the four poles comprising a section 58 is 9 inches. In a twelve foot resolver segment 8 then, there are sixteen sections 58, and sixteen secondary coil group output lines 35 and 45 for each phase carried in buses 64 and 65, respectively. In the 9 foot section there are only twelve sections 58.

It should be understood that the number of sections 58, and the physical dimensions of the sections 58 are completely flexible, which is a principle advantage of this invention. For example, miniature coils could be used, decreasing the physical length of each section 58 to an inch or less. By the same token, the sections 58 could be made very large to span great distances. And since a linear resolver 1 of this invention has the capability to track multiple leading and trailing edges, the number of sections 58 can be increased to accommodate the tracking of any number of pieces of magnetic material simultaneously and independently.

Figure 8:
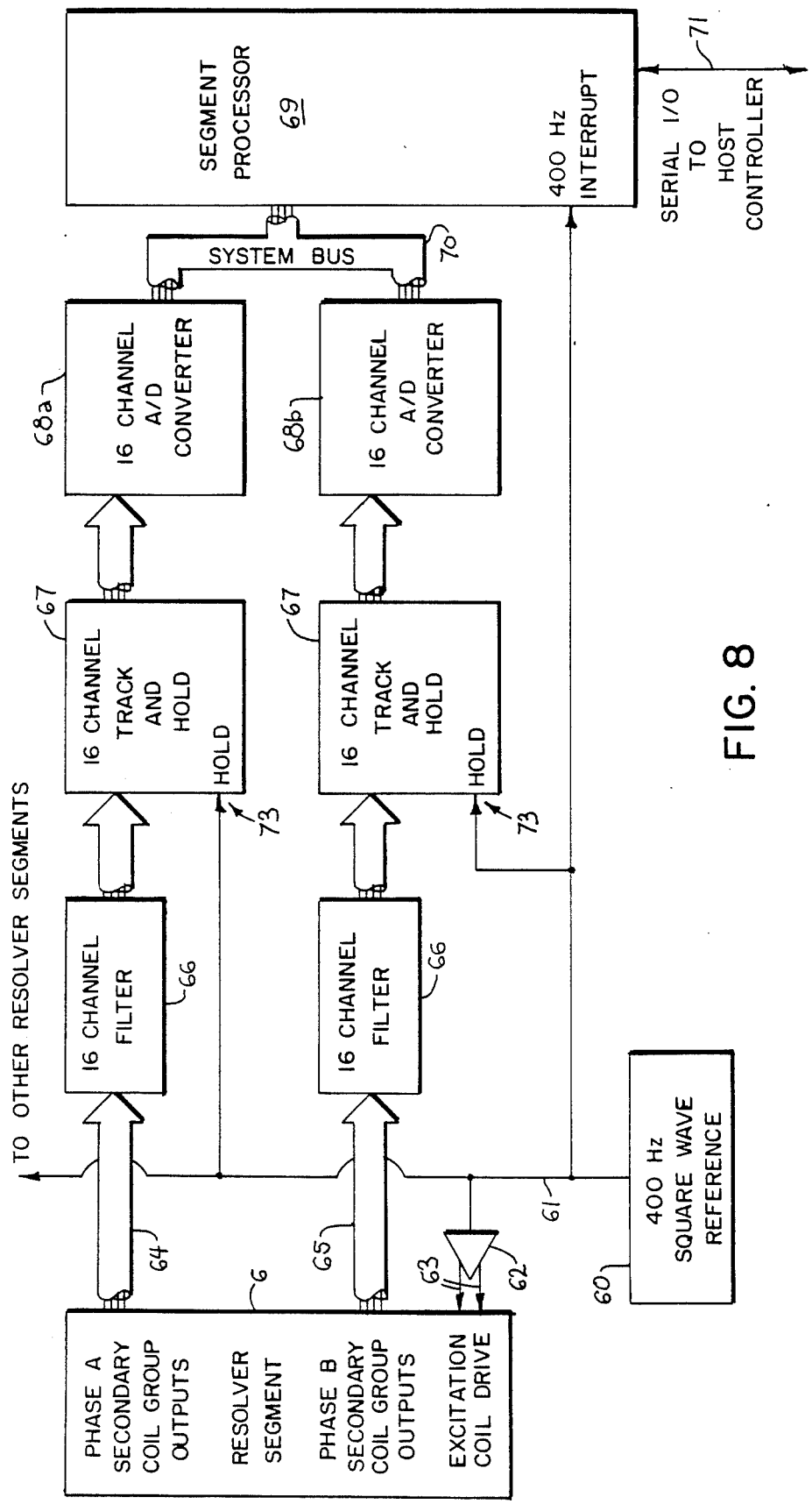
FIG. 8 is a block diagram of the decoding system for the linear resolver of FIG. 2.

Referring now to FIG. 8, the phase A and phase B secondary coil group outputs 35 and 45 on buses 64 and 65, respectively, are first processed through filters 66. Each filter 66 has 16 independent channels, with each channel comprising a low pass filter followed by a band pass filter to filter out transients caused by the switching currents in the nearby linear motors 3. The selected excitation frequency of 400 Hz it chosen because it is geometrically midway between the low frequency fundamental frequency of 60 Hz for the linear motors 3 and the higher chopping frequency of 2600 Hz used for the linear motors 3.

After filtering, the independent secondary coil group outputs are fed into track and hold circuits 67. Each track and hold circuit 67 comprises sixteen independent channels for independently tracking each secondary coil group output. Each track and hold circuit 67 also includes a hold input 73 connected to the 400 Hz square wave reference signal 61. When the signal 61 becomes active, the track and hold circuits 67 are put into the hold state, thereby capturing, or sampling the voltage values on the phase A and phase B secondary coil group outputs.

It should be understood that the values so held by the track and hold circuit 67 will be the peak values output by the secondary coil groups during the previous half cycle of the 400 Hz square wave reference 60, because the secondary coil group outputs will not have had enough time to change before the track and hold circuit 67 are put into the hold state. This instantaneous capturing of the peak value on each secondary coil group output is necessary to allow the subsequent conversion to digital form before the peak values have had a chance to change. Also, note that if a secondary coil group output is exhibiting reversed polarity, the peak voltage sampled will be of the opposite sign.

The independent output channels from the track and hold circuit 67 are then each connected to a 16 channel analog to digital (A/D) converter. The particular converter used in this embodiment is a Burr Brown Model No. SDM 857, which provides for selection of any one of the sixteen input channels. One of the converters 68a is dedicated to converting the phase A secondary coil group outputs, and the other converter 68b is dedicated to the phase B secondary coil group outputs.

Both converters 68a and 68b are under the control of a segment processor 69 via a system bus 70. As described below, the segment processor 70 carries out the decoding of the information contained in the secondary coil group outputs, and is an important part of this invention. The segment processor 69 is also connected to the 400 Hz square wave reference signal 61 to provide a time reference interrupt for the conversions. The segment processor 69 outputs the calculated position information to a host controller (not shown) via a serial I/O communications line 71.

Figure 9:
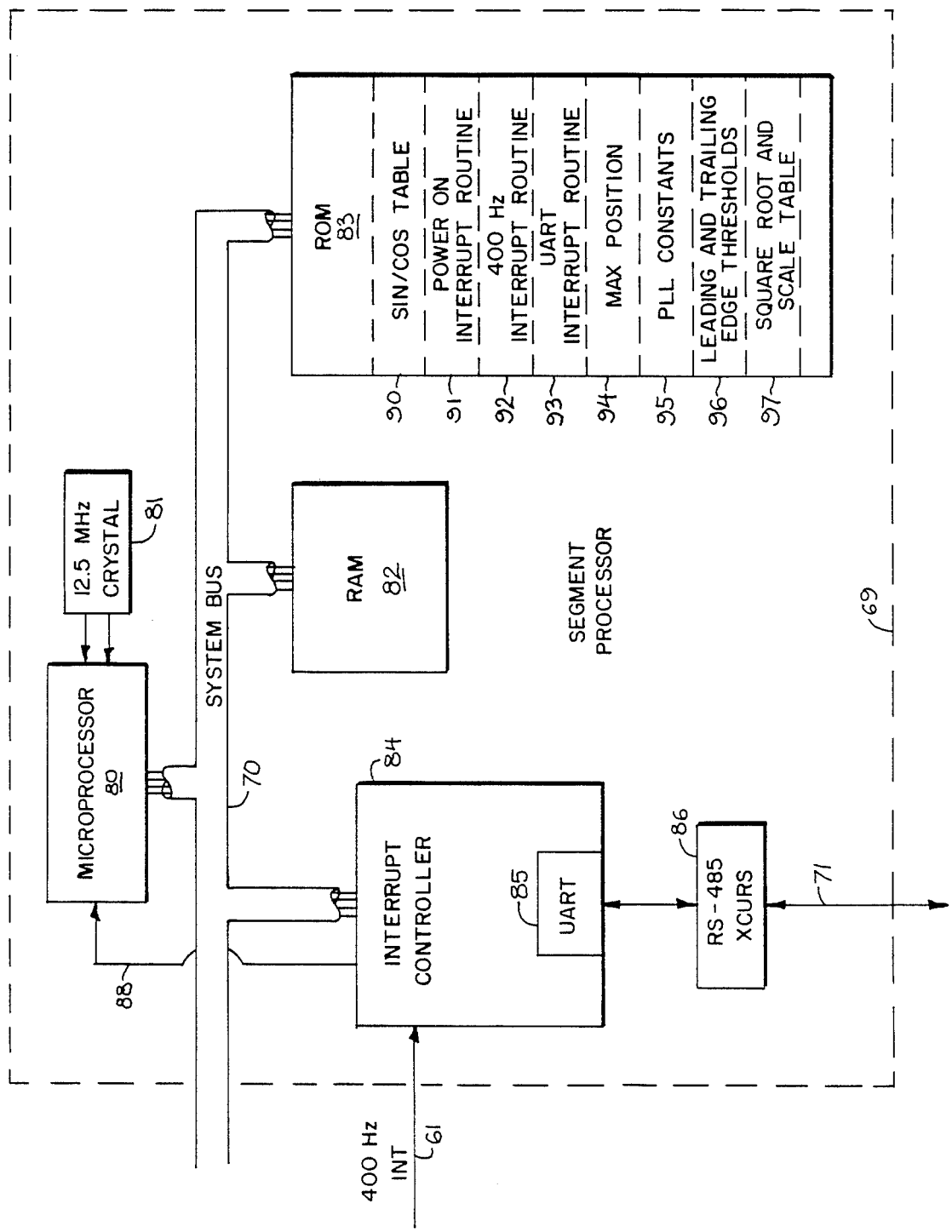
FIG. 9 is a block diagram for the segment processor which forms a part of the decoding system of FIG. 8.

Referring to FIG. 9, the segment processor 69 is based on a sixteen bit microprocessor 80. The microprocessor 80 preferred for this embodiment is a type 68000 manufactured by Motorola, Inc. A 12.5 MHZ crystal 81 is connected to the microprocessor 80 to provide operation at a 12.5 MHZ frequency. The microprocessor 80 controls the system bus 70 which connects to random access memory (RAM) 82, read only memory (ROM) 83, and an interrupt controller 84, in addition to the A/D converters 68 described above.

Figure 10:
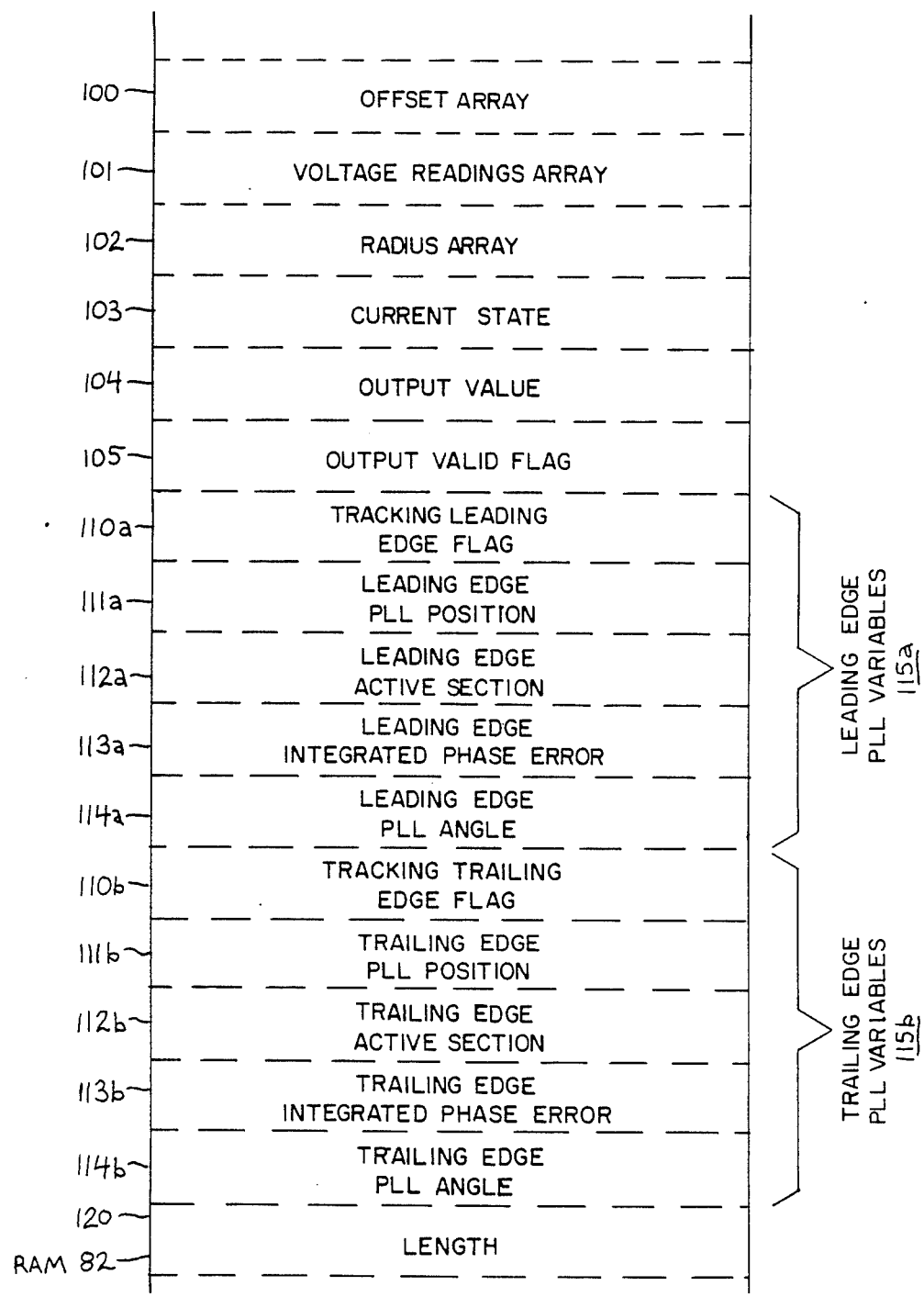
FIG. 10 is a partial memory map of the random access memory (RAM) which forms a part of the segment processor of FIG. 9.

The RAM 82 and ROM 83 contain several of the constants and variables used in the decoding process described below. The interrupt controller 84 includes a built-in universal asynchronous receiver transmitter (UART) 85 which provides the serial communication over line 71 via a set of RS-485 transceivers 86. In addition, the interrupt controller 84 accepts the 400 Hz interrupt on line 61 and prioritizes it with other interrupts, including the internal interrupt from UART 85, and generates a composite interrupt 88 for the microprocessor 80. A listing of some of the variables used in the decoding process contained in RAM 10 is shown in FIG. 10.

SOFTWARE DESCRIPTION

Figure 11:
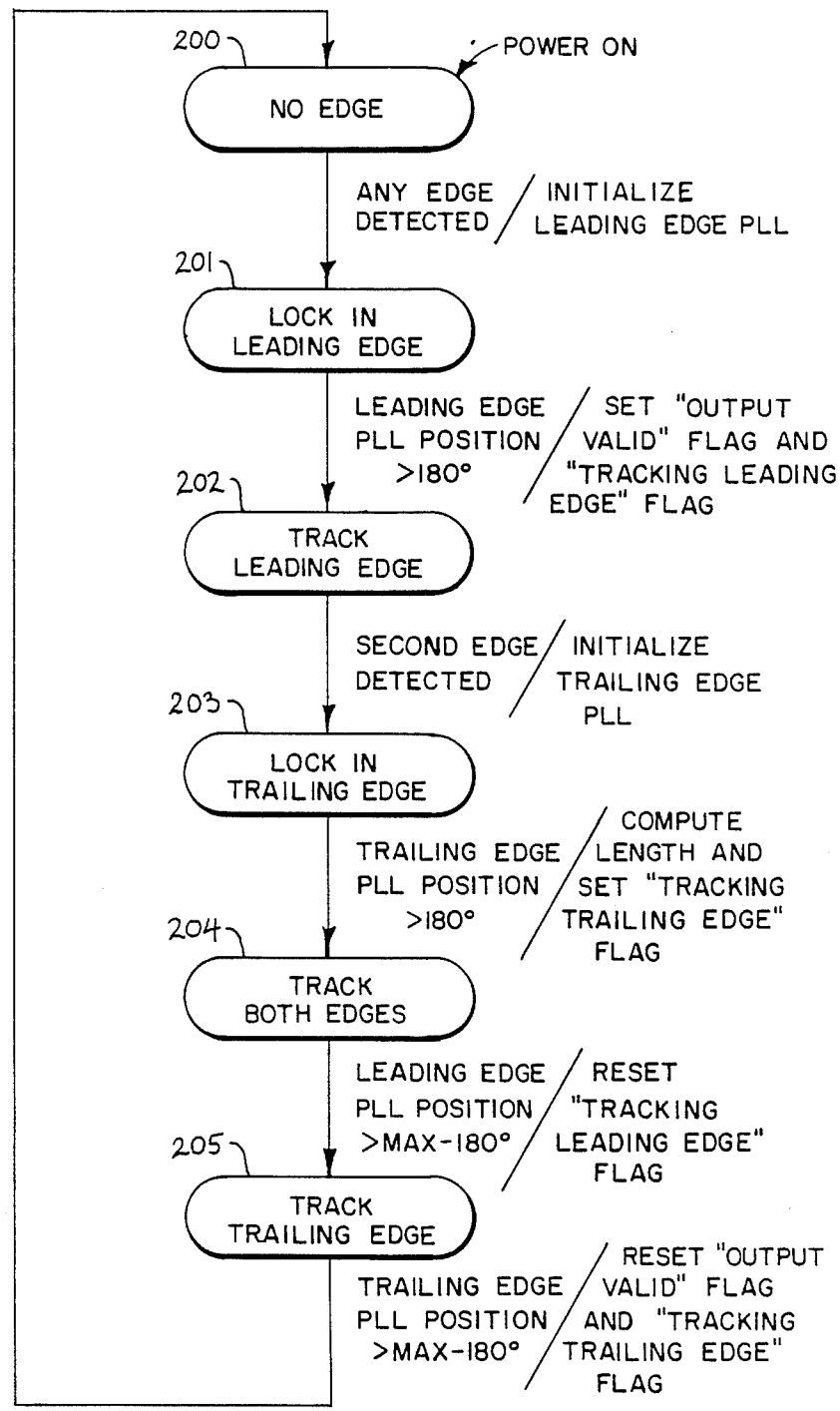
FIG. 11 is a state transition diagram for the software executing on the segment processor of FIG. 9.

Referring to FIG. 11, because each section 58 is independently sampled, a linear resolver of this invention is able to track multiple edges as they pass over the resolver 1. As noted above, the sections 58 are sensitive only to edges of magnetic material; the section output is zero when either completely covered or completely uncovered. Each section 58 is therefore physically sized according to the size of magnetic material which is expected to be encountered. That is, the piece of magnetic material should preferably be at least twice as long as a resolver section 58.

Having met this criteria, this invention is able to track both the leading and the trailing edges 6 and 7 of the piece of magnetic material as it passes over a resolver segment 8, because the leading edge 6 will reside over one section 58, while the trailing edge 7 will reside over another, independent section 58 The description below for the decoding scheme implemented in the segment processor 69 describes how the leading and trailing edges of a piece of magnetic material are independently and simultaneously tracked.

Referring to FIG. 11, the decoding software in the segment processor 69 is basically state driven. Following a power-up of the segment processor 69, the operating state is initialized to a "no edge" state 200. In the "no edge" state 200 it is assumed that no edges are present over the resolver segment 6. At each occurrence of the 400 Hz interrupt, or every 2.5 milliseconds, the prevailing conditions are interrogated to determine if a change in state is warranted.

From the "no edge" state 200, the condition checked is the detection of any edge on any of the sections 58. If no edges are detected, the state remains "no edge" 200. If, on the other hand, at least one edge is detected, then a leading edge phase locked loop (PLL) is initialized to track the edge, and the state is changed to the "lock in leading edge" state 201.

In the "lock in leading edge" state 201, a test is made to determine if the edge being tracked by the leading edge PLL is at a position more than 180° into the resolver segment. In this context, the terminology "180°" is understood to mean the linear distance corresponding to one-half of a cycle for a section 58, or 4.5 inches in this particular embodiment.

This test of the leading edge against the 180° position is made to insure that the leading edge PLL is locked onto a true edge at a distance which is far enough away from the left edge boundary of the resolver segment 8 to insure an accurate reading. In the first half-cycle of the first section 58, there may be anomalies in the readings, particularly if the resolver segment 8 is the first in a series and there is no preceding section 58 to coordinate with. If the above described condition is satisfied, "output valid" and "tracking leading edge" flags are set, and the state is changed to a "track leading edge" state 202.

While in the "track leading edge" state 202, the leading edge PLL continues to run, providing an accurate indication of the leading edge 6 of the sheet of magnetic material as it passes over the resolver segment 8. At the same time, a complete scan of the sections 58 not containing the leading edge is made to determine if a second, or trailing edge has come onto the resolver segment 8. If it has, then a second phase locked loop, designated herein as a trailing edge PLL, is initialized, and the state is changed to a "lock in trailing edge" state 203.

In the "lock in trailing edge" state 203, the leading edge PLL continues to run, maintaining an accurate position for the leading edges. In addition, the trailing edge PLL begins to track the trailing edge 7, and when that trailing edge 7 is beyond the 180° position, as described above in relation to the leading edge 6, then the trailing edge PLL is considered locked onto the trailing edge 7.

At that time, a length value 120 is computed as being the difference between the leading edge 6 and trailing edge 7 positions. This length value 120 can then later be used to estimate a position for the leading edge 6 even after the leading edge 6 has left the resolver segment 8 by adding the length value 120 to the position of the trailing edge 7 still being tracked. Also, a "tracking trailing edge" flag is set to indicate that the trailing edge PLL is also locked in, and the state is changed to a "track both edges" state 204.

In the "track both edges" state 204, both the leading edge and trailing edge phase locked loops continue to run, simultaneously and independently maintaining an accurate position indication for their respective edges. In this state, a test is made of the position of the leading edge 6 to determine if it is within one-half cycle of the far, or right edge of the resolver segment 8.

If it is, then the accuracy of the position measurement is degraded for the same reasons as described above in relation to a edge first coming on to the resolver segment 8. In that condition, the leading edge 6 is considered to be off the segment 8, and the "tracking leading edge" flag is reset accordingly. The state is then changed to a "track trailing edge" state 205, where only the trailing edge is tracked.

Eventually, the trailing edge 7 also leaves the resolver segment 8, at which point the "output valid" and "tracking trailing edge" flags are reset, and the state is changed back to the "no edge" state 200. This cycle then repeats as another piece of magnetic material comes onto the resolver segment 8 and is tracked across it.

Figure 12:
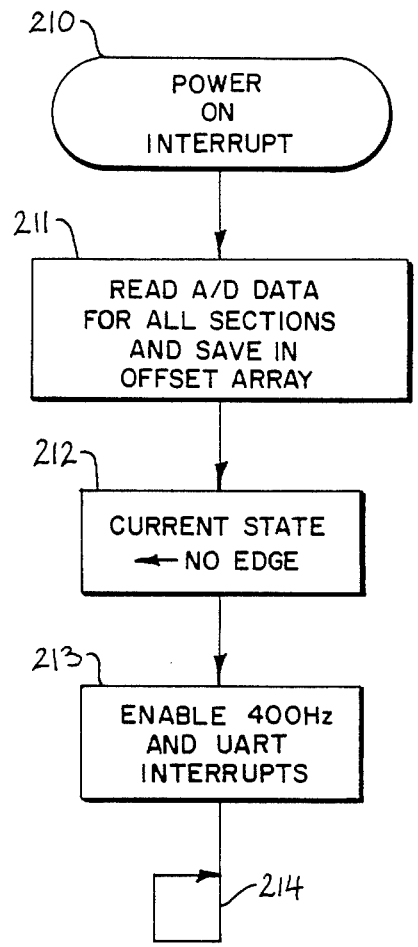
FIG. 12 is a flow diagram for the power-on interrupt routine which forms a part of the segment processor of FIG. 9.

Referring to FIG. 12, the software executed by microprocessor 80 resides in ROM 83. The first routine to be executed after power-up of the microprocessor 80 is a power-on interrupt routine 91. The power-on interrupt routine 91 enters at block 210 automatically upon receipt of a power-on interrupt.

From block 210, processing proceeds to block 211. In process block 211, a scan is made of both the phase A and phase B outputs for all of the secondary coil groups in the linear resolver. The individual voltage readings obtained are assumed to be an offset value. In an ideal case, these offsets would be zero if the physical construction of the resolvers 1 were perfectly symmetrical. However, in an actual implementation it has been determined that some small amount of residual offset may be present in a secondary coil group even when completely covered or completely uncovered. During the power-on interval, it is assumed that there is no magnetic material present over the resolver 1. Therefore, by reading all of the secondary coil group output voltages in the quiescent state, their residual, or offset value is obtained.

The individual offset value for each secondary coil group is stored in an offset array 100 maintained in RAM 82 (FIG. 10). As described later, when the secondary coil group outputs are subsequently scanned, the offset values from the offset array 100 are subtracted from the measured value to eliminate the effect of the offset.

After process block 211, processing continues at block 212, where the current state variable 103 is initialized to the "no edge" state. Then at process block 213, the interrupts for the 400 Hz square wave reference and the UART are enabled. From that point on, processing is performed on an interrupt driven basis. The UART interrupt and the communications with the host controller (not shown) over serial I/O line 71 are processed in the normal manner as is well known in the art, and need not be described herein.

The 400 Hz interrupt provides the basic timing for state machine transitions and all of the other decoding logic. Once the interrupts are enabled at block 213, a background idle loop is entered at 214.

Figure 13:
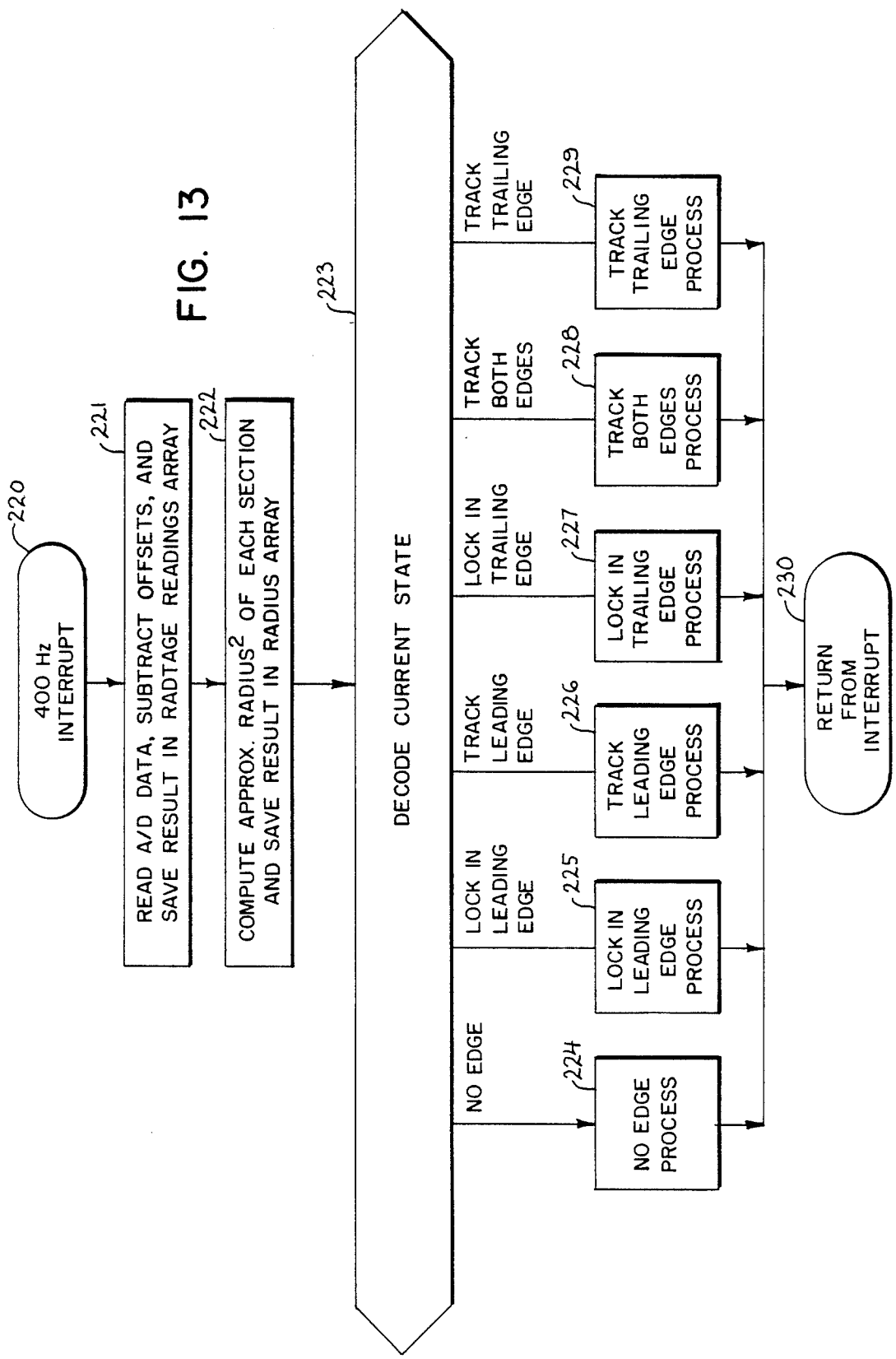
FIG. 13 is a flow diagram for the 400 Hz interrupt routine which forms a part of the segment processor of FIG. 9.

Referring to FIG. 13, the 400 Hz interrupt enters at block 220 and proceeds to block 221. In block 221, all of the secondary coil group voltages, phase A and phase B for all sections 58, are input from A/D converters 68a and 68b. This process is performed sequentially, one input at a time, in an interleaved manner between the two A/D converters 68a and 68b. For each reading obtained, the corresponding offset value from the offset array 100 is subtracted, as described above, and the result is saved in a voltage readings array 101 of RAM 82 (FIG. 10).

After reading an A/D input, a small interval of time must pass before the next sample is converted. During that interval, an approximate value of the radius$^2$ for each section is computed and the result is saved in a radius array 102 in RAM 82 (FIG. 10). The concept of a radius is based on the representation of the phase A and phase B signals as orthogonal vectors, e.g. the sine and cosine of a given angle, in this case phase along the linear length of the segment 58. In that sense, the radius defined by those sine and cosine signals is equal to the square root of the sum of the sine squared and cosine squared.

In this case, a sum is performed of the phase A signal squared and the phase B signal squared, with the result being a value of the radius squared. The square root of the radius$^2$ is not taken, since the radius$^2$ values are only used as an indication of the presence of an edge in any given section 58. Note also that this calculation would not be a true value of the radius squared in the case that one of the signals, phase A or phase B, was in a region were the opposite signal is zero, i.e. first or last quarter cycle. Again, this is still satisfactory for the purposes were only an indication of the presence of an edge in a section 50 is necessary.

After the processing in block 221, control passes to decision block 223 were the current state variable 103 is decoded. Depending on the value of the current state 103, processing continues by performing the appropriate process 224–229. Each of these processes 224–229 corresponds to one of the operating states, and each is described in detail below. After the appropriate state processing in one of blocks 224–229, the 400 Hz interrupt routine exits at 230.

Figure 14:
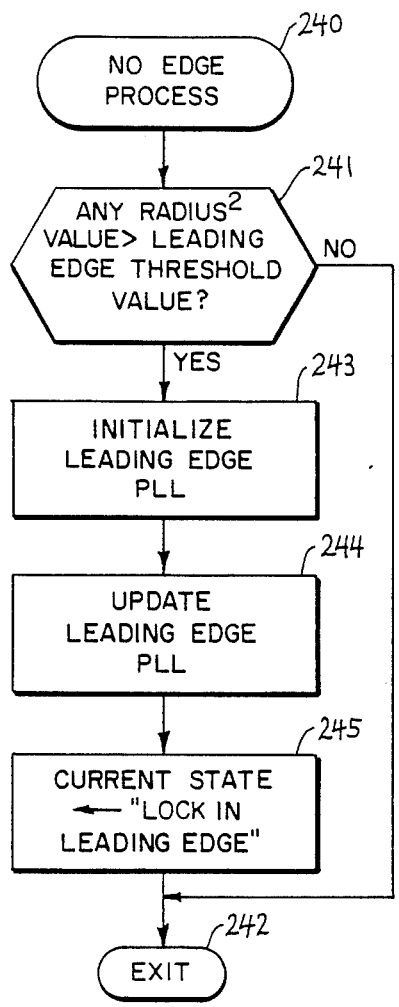
FIG. 14 is a flow diagram of the "no edge" process which forms a part of the 400 Hz interrupt routine of FIG. 13.

Referring to FIG. 14, the processing for the "no edge" state begins at block 240 and proceeds to decision block 241. In decision block 241, all of the radius$^2$ values in the radius array 102 are interrogated. If any of the radius$^2$ values exceed a threshold value, designated herein as the leading edge threshold value, then the section 58 corresponding to that radius$^2$ entry is considered to contain an edge. If all of the radius$^2$ values are below the leading edge threshold value, e.g. no edges are present, then the no edge process exits at 242. If, on the other hand, at least one radius$^2$ value was found which exceeds the leading edge threshold value, then an edge has been found an processing continues at block 243. In block 243, the leading edge phase locked loop is initialized as follows.

Referring briefly to FIG. 10, the RAM 82 contains a set of leading edge PLL variables 115a which form the basis for the leading edge PLL operation. To initialize the leading edge PLL, the leading edge active section 112a is initialized to be the rightmost, or highest numbered section 58 in which a radius$^2$ value was found to exceed the leading edge threshold; in other words the farthest edge in the known direction of travel, e.g. to the right in this embodiment.

Next, the leading edge integrated phase error 113a is set to zero. Finally, a leading edge PLL angle 114a is initialized to a value corresponding to 180°. As explained above, in the context of linear resolvers, angular references refer to the corresponding linear distance, wherein the length of one section 58 represents 360°. In this embodiment, the length of one section 58 is resolved to a precision of ten bits, or 1024 counts. 180° therefore corresponds to a count of 512 which is the value loaded initially as the leading edge PLL angle 114a.

Referring again to FIG. 14, after initializing the leading edge PLL at block 243, processing continues at block 244 where the leading edge PLL is updated. The operation of the leading edge PLL is similar to other types of digital phase locked loops known in the art, and is described in detail later. Updating of the leading edge PLL is performed by cycling the leading edge PLL through one digital cycle using the input values obtained during the current interrupt cycle. The leading edge PLL will thereby follow, or track, to a high precision the motion of the leading edge 6 across the resolver segment 8.

After updating the leading edge PLL at block 244, control transfers to block 245 where the current state 103 is changed to the "lock in leading edge" state before exiting at 242.

Figure 15:
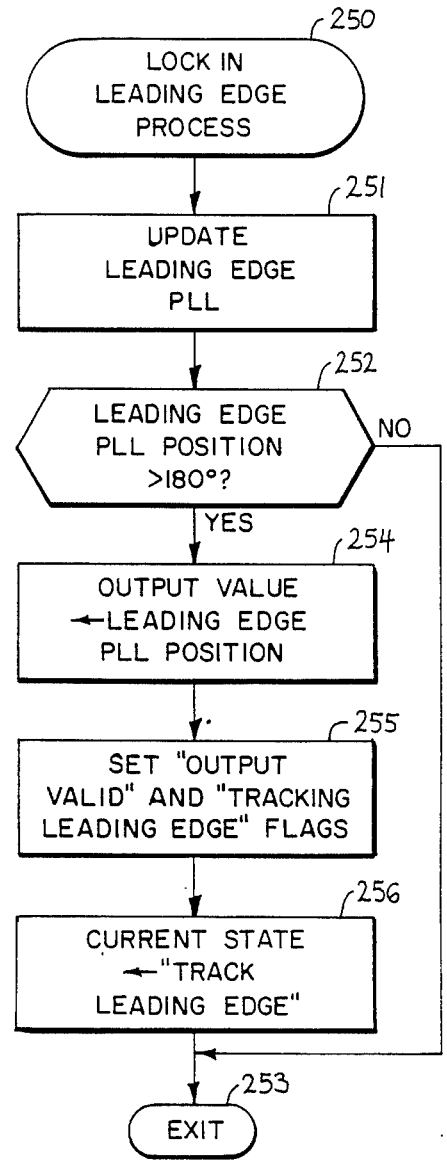
FIG. 15 is a flow diagram for the "lock in leading edge" process which forms a part of the 400 Hz interrupt routine of FIG. 13.

Referring to FIG. 15, the "lock in leading edge" process 225 begins at block 250, and then proceeds to block 251. In block 251 the leading edge PLL is updated one iteration based on the current values obtained during this interrupt cycle. After updating the leading edge PLL, control transfers to decision block 252, where a test is made to determine if the position of the updated leading edge PLL is greater than 180°.

As mentioned above, the accuracy of the leading edge PLL in the first 180° of position may be degraded. Therefore, the leading edge PLL is not considered to be locked in until the leading edge PLL position is beyond the 180° point; in other words more than half of the length of the first section 58. If the leading edge PLL has not attained at least this position, then a branch is taken directly to exit 253 and the current state remains in the "lock in leading edge" state. If on the other hand the 180 degree position has been attained, then control transfers to block 254.

At block 254 the leading edge PLL position is considered valid, and is loaded into an output value buffer 104 in RAM 82 (FIG. 10). Although not explicitly described herein, the segment processor 69 is interrogated by the host controller (not shown) over the serial communications line 71 with a single interrogation character at the same 400 Hz rate. The segment processor 69 responds to the interrogation character by returning two eight-bit characters to the host controller containing the output value 104. The host controller is thereby continually appraised of the position of the leading edge of a piece of magnetic material over the resolver segment 8. It should be appreciated that many other forms of output are within the scope of this invention, for example, direct readout from the segment processor 69 to an indicating device, or other control interfaces.

After setting the output value at block 254, control transfers to block 255 where the "output valid" and "tracking leading edge" flags 105 and 110a, respectively, are set. As these names imply, these flags indicate respectively that the output value is valid and that the leading edge is being tracked. Processing then continues at block 256 where the current state variable 103 is changed to the "track leading edge" state before exiting at 253.

Figure 16:
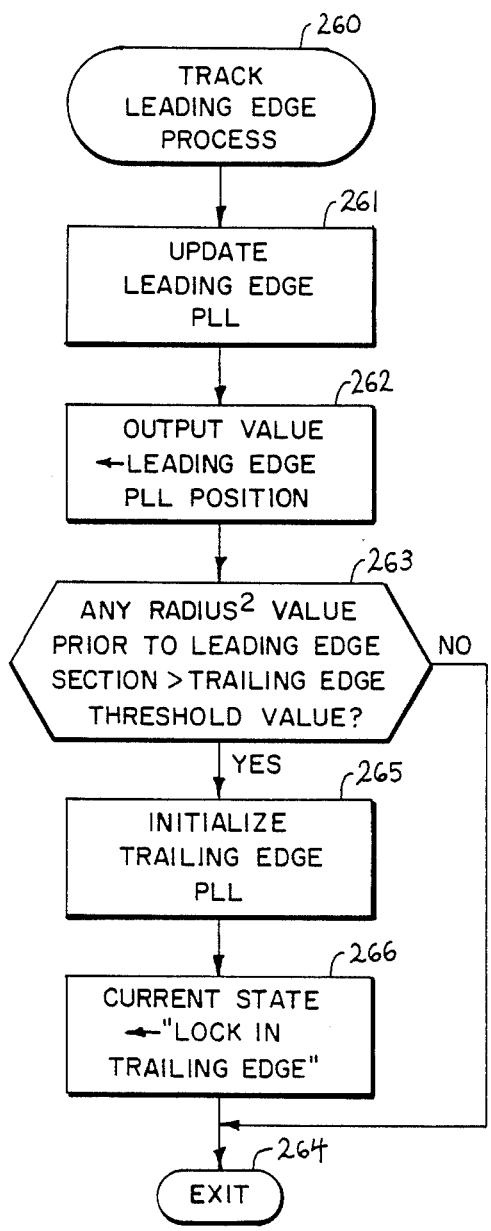
FIG. 16 is a flow diagram for the "track leading edge" process which forms a part of the 400 Hz interrupt routine of FIG. 13.
Figure 17:
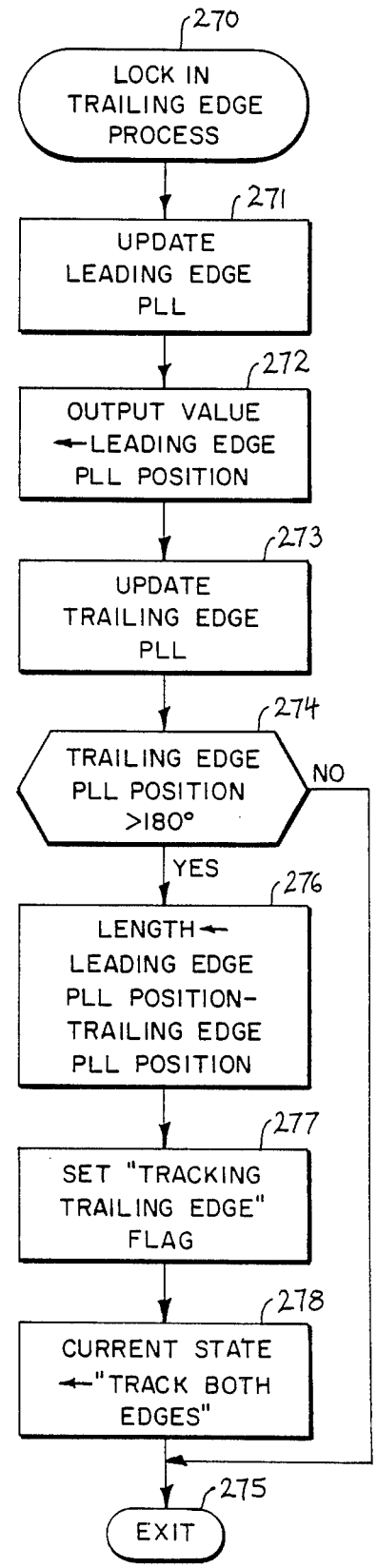
FIG. 17 is a flow diagram for the "lock in trailing edge" process which forms a part of the 400 Hz interrupt routine of FIG. 13.

Referring to FIG. 16, the track leading edge process 226 begins at block 260 and proceeds to block 261. In block 261, the leading edge PLL is again updated based on the current values obtained during the current interrupt cycle. Processing then continues at block 262 where the output value 104 is loaded with the leading edge PLL position 111a calculated during the leading edge PLL update.

Next at decision block 263, a scan is made of the radius$^2$ values in all of the sections 58 prior to the section 58 in which the leading edge 6 is known to reside. In other words, this test is looking for a trailing edge 7 coming on to the resolver segment 8. If any radius$^2$ value prior to the current leading edge section is greater than a trailing edge threshold value, then that section 58 is assumed to contact a trailing edge 7. Note that the trailing edge threshold value may vary slightly from the leading edge threshold value due to a small difference in output between a covered and uncovered secondary coil group.

If a trailing edge is not found, then a branch is taken directly to exit 264. If a trailing edge is found, then processing continues at block 265 where a second phase locked loop designated herein as the trailing edge PLL is initialized. Referring again to FIG. 10, a separate set of trailing edge PLL variables 115b is allocated for operation of the trailing edge PLL.

The trailing edge PLL is initialized in a manner similar to that for the leading edge PLL. The trailing edge active section 112b is set to the section nearest to the section containing the leading edge in which the radius$^2$ value was found to exceed the trailing edge threshold value in block 263. In other words, the trailing edge active section is initialized to be the nearest section to the leading edge 6. Also, as with the leading edge PLL, the trailing edge integrated phase error is initialized to zero and the trailing edge PLL angle is initialized to 180°. After initializing the trailing edge PLL at block 265, the current state is changed to the "lock in trailing edge" state in block 266. The "track leading edge" process then exits at 264.

The "lock in trailing edge" process 227 enters at block 270 and proceeds to block 271. At block 271, the leading edge PLL is updated one iteration based on the current values obtained during this interrupt cycle. Processing then continues at block 272 where the leading edge PLL position just obtained from the leading edge PLL update is loaded into the output value 104. Then at block 273, the trailing edge PLL is also updated based on the current values obtained during this interrupt cycle. At decision block 274, the trailing edge PLL position is then tested to determine if it is greater than the 180° position.

If it is not, then the trailing edge PLL is not considered locked in, and a branch is taken to exit 275. If the trailing edge PLL has achieved the 180° position or greater, then processing transfers to block 276. At block 276, a length value 120 is computed as the leading edge PLL position minus the trailing edge PLL position. Since both the leading edge and trailing edge PLL positions reflect an accurate measurement of their respective edges, the length 120 also reflects a highly accurate measurement of the length between the leading and trailing edges, e.g. the length of the piece of magnetic material covering the resolver segment.

After calculating the length 120 in block 276, processing continues at block 277 where the "tracking trailing edge" flag is set. Then at block 278, the current state is set to the "track both edges" state before exiting at 275.

Figure 18:
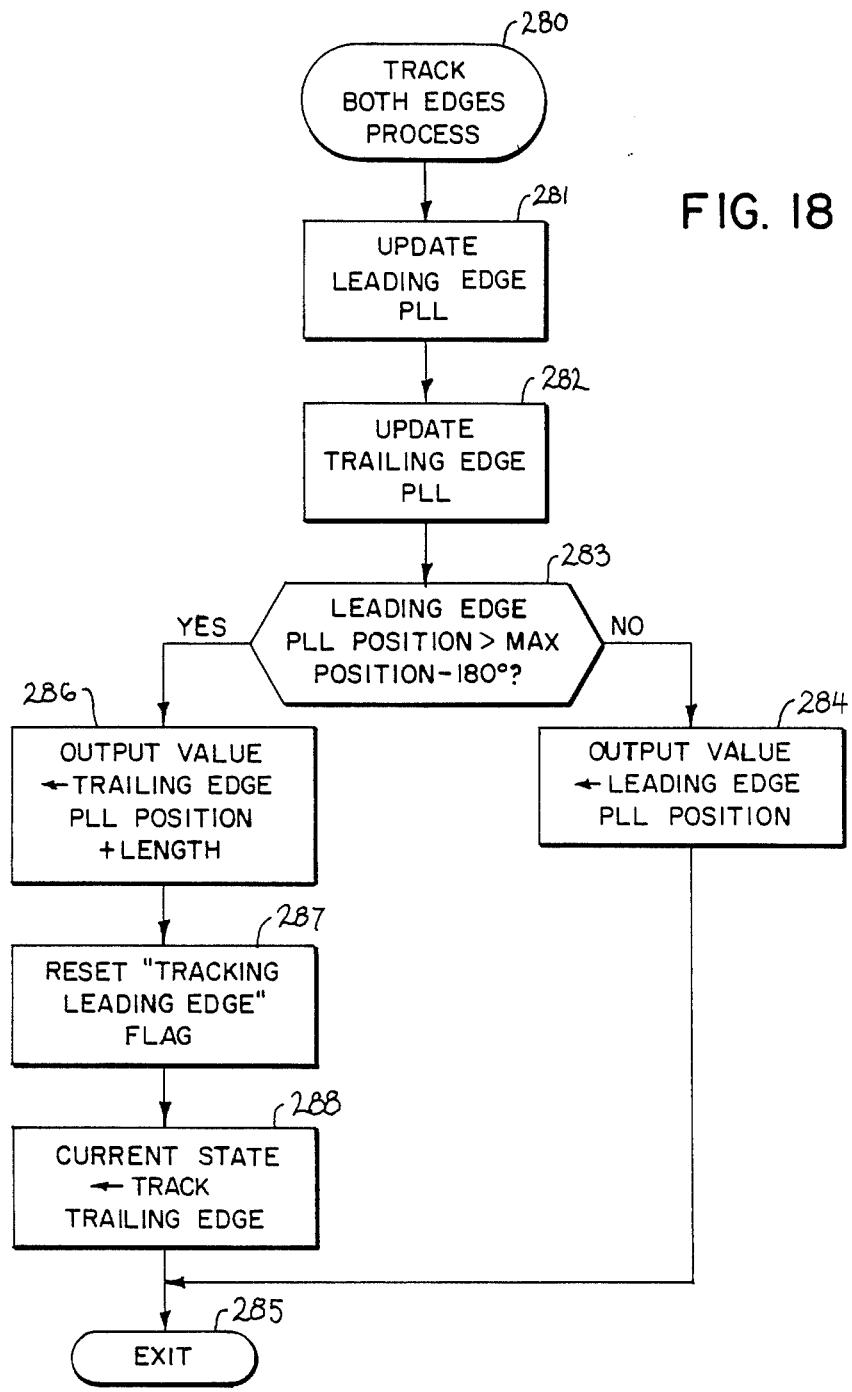
FIG. 18 is a flow diagram for the "track both edges" process which forms a part of the 400 Hz interrupt of FIG. 13.

Referring to FIG. 18, the track both edges process 228 enters at 280 and proceeds to block 281. In block 281 the leading edge PLL is updated by cycling through one iteration with the values obtained during this interrupt cycle. Then at block 282, the trailing edge PLL is updated in a similar fashion. Proceeding to block 283, a decision is made as to whether the leading edge PLL position is getting too close to the far end of the resolver segment 8. A max position value 94 is maintained in the ROM 93 to indicate the position corresponding to the end of the resolver segment 6. This max position is a function of the length of each section 58 and the number of sections 58 in the resolver segment 8. When the leading edge PLL position is within 180 degrees, or half the length of one section 58, then the leading edge PLL position calculated may not be reliable. In that case, the leading edge is considered to be off the resolver segment 8, and is no longer tracked. Therefore, at block 283, if the leading edge PLL position is less than or equal to the max position minus 180 degrees, then control transfers to block 284 where the still valid leading edge PLL position 111a is transferred to the output value 104. Then exit 285 is taken out of the track both edges process 228.

Back at decision block 283, if the leading edge PLL position 111a is greater than the max position 94 minus 180 degrees, then a branch is taken to decision block 286. In decision block 286, the previously computed length 120 for the piece of magnetic material being tracked is added to the trailing edge PLL position 111b. The result is a calculated position for the leading edge 6, even if that leading edge is beyond the end of the resolver segment 8. The value so calculated is then assigned as the output value 104. The output value 104 which is reported to the host system is therefore always the current position of the leading edge 6, even if the leading edge 6 is off the resolver segment 8 and the trailing edge 7 is being tracked. Processing then continued at block 287 where the "tracking leading edge" flag 110a is reset and block 288 where the current state variable 103 is set to the "track trailing edge" state. Finally, the track both edges process 228 exits at 285.

Figure 19:
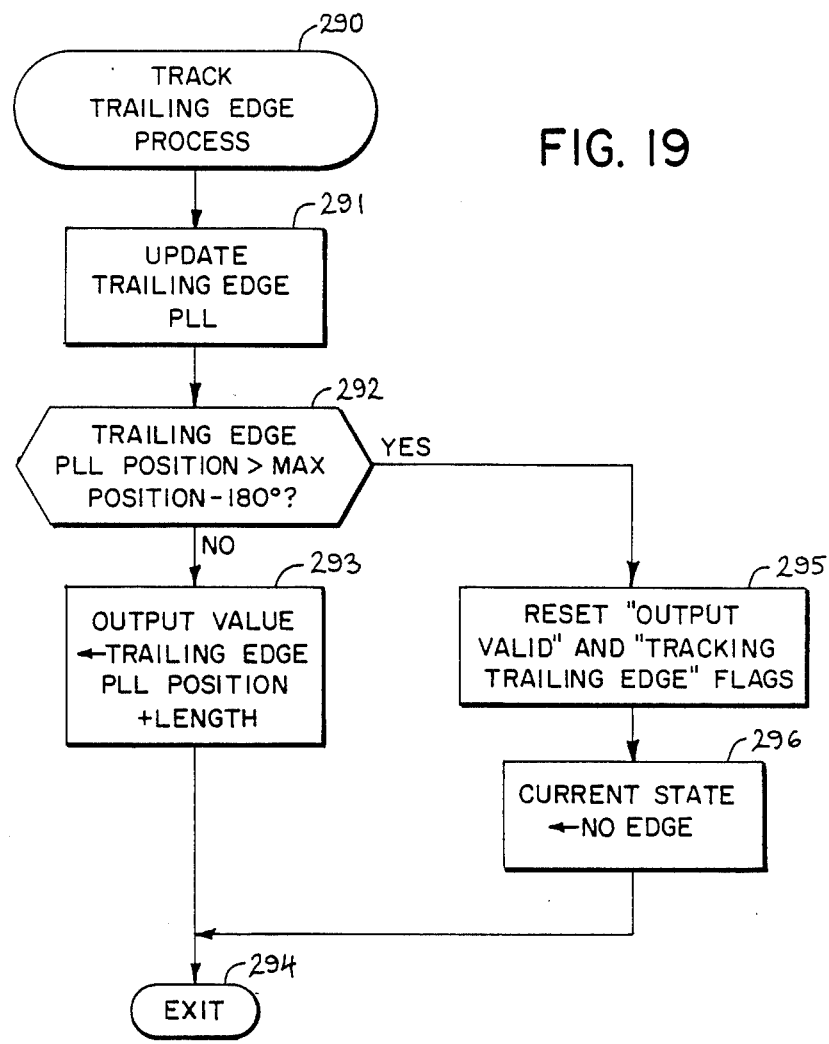
FIG. 19 is a flow diagram for the "track trailing edge" process which forms a part of the 400 Hz interrupt routine of FIG. 13.

Referring to FIG. 19, the track trailing edge process 229 enters at 290 and continues at block 291. At block 291, the trailing edge PLL is updated based on the current values obtained during the current interrupt cycle. Then at decision block 292, a test is made to determine if the trailing edge PLL position 111b is within 180 degrees of the max position 94. If it is, then the trailing edge 7 is also considered off the end of the resolver segment 6, and control transfers to block 295. At block 295, the "output valid" and "tracking trailing edge" flags 105 and 110b, respectively, are both reset. Then at block 296 the current state 103 is set to "no edge" before exiting at 294. Back at decision block 292, if the trailing edge PLL position is still in the valid range, then control transfers to block 293 where the output value 104 is again assigned with the computed position of the leading edge, e.g. the trailing edge PLL position 111b plus the length 120. From block 292, the track trailing edge process 229 exits at 294.

Figure 20:
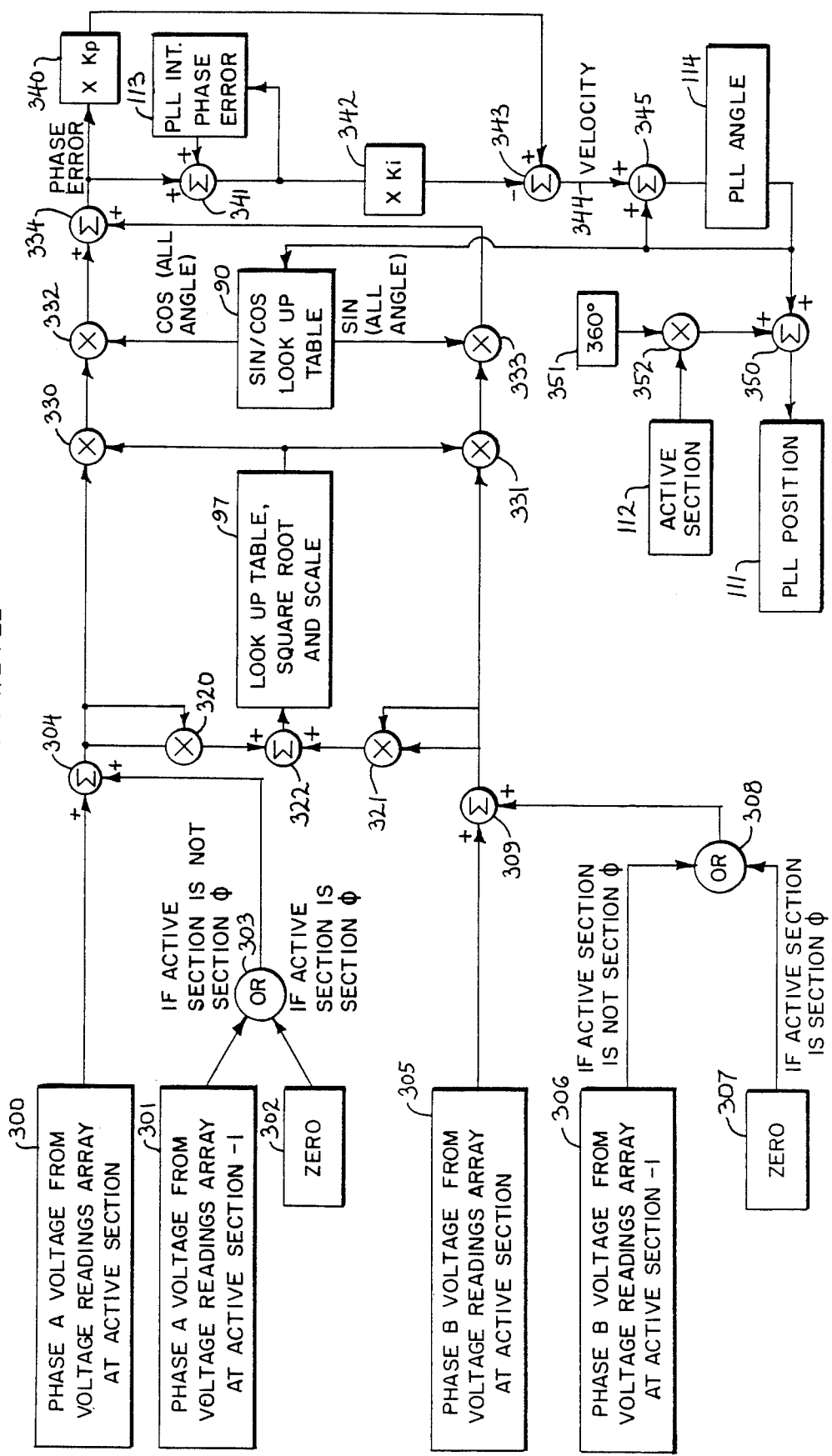
- FIG. 20 is a flow diagram for updating the digital phase locked loop which forms a part of the processes of FIGS. 14, 15, 16, 17, 18, and 19.

Referring to FIGS. 7 and 20, the detailed operation of the leading edge and trailing edge phase locked loops can now be described. It should be understood that the following description is applicable to both the leading edge PLL and the trailing edge PLL acting on the corresponding sets of variables 115a or 115b, respectively. Further, it is understood that the leading edge and trailing edge phase lock loops are implemented in digital form, and that the flow depicted in FIG. 20 represents a single iteration, or update cycle. Finally, although the PLL update processes is represented in FIG. 20 in flow diagram form, the actual phase lock loops are implemented as the equivalent software running on the microprocessor 80 as should be apparent to those skilled in the art.

At block 300, the first step in updating a PLL is to obtain the phase A voltage from the voltage readings array 101 at the active section 112. The active section 112 is understood to be either the leading edge active section 112a or the trailing edge active section 112b, depending on whether the leading edge PLL or trailing edge PLL, respectively, is being updated. A composite of the outputs of two consecutive sections is then formed by adding the voltage from block 300 to the phase A voltage from the preceding section in block 301 in summer 304. An OR function 303 is provided for the case that the active section in block 300 is the first section of the resolver segment, or section 0. In that case, there is no preceding section, and a value of zero 302 is substituted for the preceding voltage value 301 before performing the summation at 304. An analogous process is carried out for the phase B voltages 305 and 306, producing a composite output in summer 309.

The outputs from summers 304 and 309 then represent the composite voltages from phase A and phase B, respectively, which are treated as orthogonal phase vectors. The next step is to normalize these vectors such that they define a fixed radius when submitted to the latter stages of the phase locked loop. This normalization compensates for any variation in the amplitudes of the phase voltages for the current phase angle.

The normalization is accomplished by calculating a radius as the square root of the sum of the squares of the individual vectors, and from that radius computing a normalization factor needed to correct the phase A and phase B composite values to define the fixed radius. The phase A and phase B composite signals are squared in multipliers 320 and 321 respectively, the sum of those squares is performed in summer 322, and the result is used as an index into a look up table 97.

The look up table 97 is set up to output a scaled square root value, which is the normalization factor necessary to correct the phase A and phase b composite signals to define a fixed radius. The phase A and phase B composite signals are so corrected by multiplying by the normalization factor in multipliers 330 and 331 respectively.

The remainder of the phase locked loop functions in the ordinary manner, by calculating a phase error according to the formula:

Phase Error = $V$Phase A*cos(PLL angle) + $V$Phase B*sin(PLL angle)

The sine and cosine values are obtained from a look up table 90 with the current PLL angle 114 as an index. Note that in the above formula, the cross products are normally subtracted, but in this case the Phase B voltage has the form of "−cos", so that the cross products are instead added. The phase error is multiplied by the customary gain factor $K_p$ feeding one input of a summer 343. The other input of summer 343 is connected to an integrated phase error multiplied by the customary constant $K_i$. The updated integrated phase error 113 is also saved for use in the next iteration. The output of summer 343 then represents a velocity 344, or incremental change. The incremental change 344 is added to the current PLL angle 114 in summer 345, and the update PLL angle is saved back at location 114.

To compute the updated PLL position 111, the active section 112 is multiplied by 360 degrees 351 in multiplier 352. The output of multiplier 352 is added to the updated PLL angle 114 in summer 350 to produce the updated PLL position 111. The PLL position 111 therefore reflects the precise position along the resolver segment 8 that the PLL is tracking.

It should be apparent to those skilled in the art that the linear resolver and decoding method according to this invention can be used with as many simultaneously running phase locked loops as desired. While this embodiment described only a leading edge and trailing edge phase locked loops for a single piece of magnetic material, it should be apparent that given enough sections 58 in a resolver segment 8, multiple, independent phase locked loops could be maintained. The number of phase locked loops which can be maintained is limited only by the relative speed of the processor 69 with respect to the update rate. The number of phase locked loops that can be maintained can be increased by increasing the speed of the processor 69, providing parallel processors 69, decreasing the update frequency, etc. In principle, however, the linear resolver of this invention is capable of providing precise position information for a plurality of edges.

It should further be apparent to those skilled in the art that many other variations of the disclosed embodiments are possible within the scope of this invention. For example, a different number of coils, or poles, may be used in each secondary coil group.

We claim:

1. A linear resolver for determining the position of an edge of an article of magnetically permeable material along a predetermined path, comprising:
    an excitation coil;
    an excitation source for producing an excitation signal in the excitation coil;
    a first group of secondary coils comprising a first coil set, the first coil set including a first plurality of individual coils arranged sequentially along the predetermined path and magnetically coupled to the excitation coil and arranged so that varying positions of the edge of the magnetically permeable object along the predetermined path causes a change in the magnitude of the magnetic coupling between the excitation coil and one of the individual coils in the first coil set, the first plurality of individual coils being electrically connected in series, with at least one of the individual coils being connected in the series with a polarity opposite to that of the remainder of the individual coils in the first plurality of individual coils, and with the ends of the series connection defining a first output for the first coil set, wherein the magnitude of the first output varies in a first cyclical pattern with respect to the position of the edge of the magnetically permeable object along the predetermined path;

a second group of secondary coils comprising a second coil set, the second coil set including a second plurality of individual coils arranged sequentially along the predetermined path and parallel to the first coil set, the second coil set being magnetically coupled to the excitation coil and arranged so that varying positions of the edge of the magnetically permeable object along the predetermined path causes a change in the magnitude of the magnetic coupling between the excitation coil and one of the individual coils in the second coil set, the second plurality of individual coils being electrically connected in series, with at least one of the individual coils being connected in the series with a polarity opposite to that of the remainder of the individual coils in the second plurality of individual coils, and with the ends of the series connection defining a second output for the second coil set, wherein the magnitude of the second output varies in a second cyclical pattern with respect to the position of the edge of the magnetically permeable object along the predetermined path, and wherein the second cyclical pattern is approximately the same shape as the first cyclical pattern and displaced from the first cyclical pattern by one quarter of one complete cycle of either cyclical pattern; and detection means connected to the first and second outputs, the detection means comprising input means for measuring the first and second outputs to produce first and second current magnitude values, respectively, and resolving means for calculating an angular value representing a point in the first and second cyclical patterns utilizing the first and second current magnitude values of the first and second outputs as sine and cosine function values, respectively, wherein the position of the edge of the magnetically permeable object corresponds to the angular value in the first and second cyclical patterns.

2. The linear resolver as recited in claim 1 in which the first and second coil sets each comprise first, second and third individual coils, wherein the first and third individual coils are approximately half as long as the second individual coil in the direction of the predetermined path, and the second individual coil is connected in the series with a polarity opposite the polarity of the first and third individual coils.

3. The linear resolver as recited in claim 1 in which the first group of secondary coils comprises a plurality of first coil sets, each first coil set providing a separate first output, and the second group of secondary coils comprises a plurality of second coil sets, each second coil set providing a separate second output, and in which the input means is connected to each separate first and second output, and the input means measures each separate first and second output and produces separate first and second current magnitude values corresponding to each first and second output, and in which the resolving means includes means for combining selected ones of the separate first and second current magnitude values to produce, respectively, first and second composite values which are then used in calculating the angular value.

4. The linear resolver as recited in claim 3 in which the resolving means includes means for independently calculating a second angular value corresponding to the position of a second edge of magnetically permeable material in addition to the first edge when the first and second edges are separated along the predetermined path by at least the length of one of the first or second coil sets.

* * * * *